May 14, 1929.  C. R. SHORT  1,712,940
STEERING MECHANISM
Filed Aug. 23, 1926
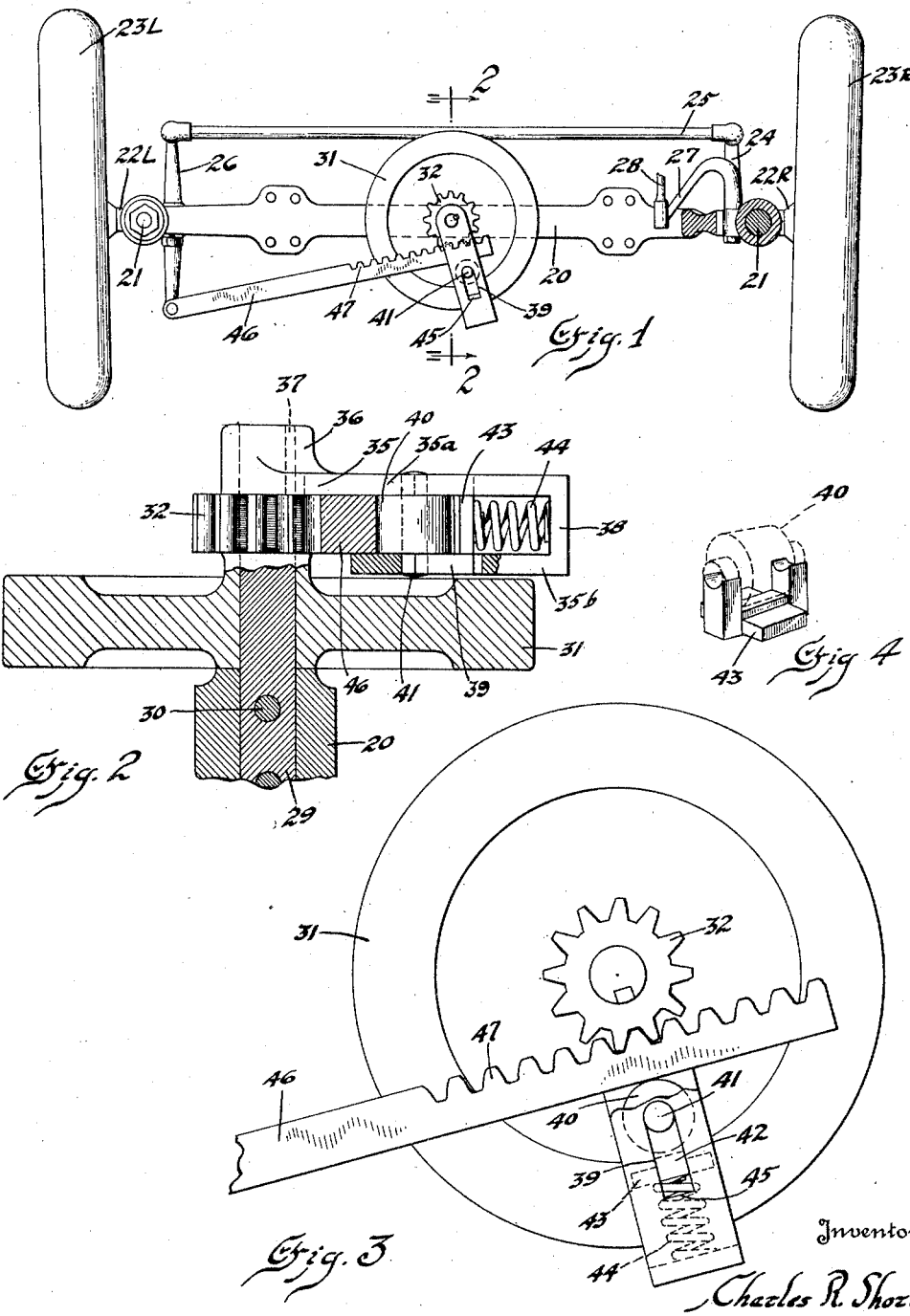
Inventor
Charles R. Short
By Blackmore, Spencer & Hulit
Attorneys Patented May 14, 1929.

1,712,940

UNITED STATES PATENT OFFICE.

CHARLES R. SHORT, OF DETROIT, MICHIGAN, ASSIGNOR TO GENERAL MOTORS RESEARCH CORPORATION, OF DETROIT, MICHIGAN, A CORPORATION OF DELAWARE.

STEERING MECHANISM.

Application filed August 23, 1926. Serial No. 131,077.

This invention relates to improvements in the steering mechanism of a motor vehicle.

The principal object of the invention is to eliminate or substantially reduce "shimmying" of the guiding roadwheels of a motor vehicle, without materially interfering with manual steering.

Further objects and advantages will be apparent from the following description, reference being had to the accompanying drawings, wherein one embodiment is illustrated.

In the drawings:

Fig. 1 is a plan view of the front axle of a motor vehicle and the steering wheels having the improvement of this application attached;

Fig. 2 is a partial section on the line 2—2 of Fig. 1;

Fig. 3 is a plan view of the anti-shimmy attachment shown in Fig. 2, a portion being broken away for sake of clearness; and Fig. 4 is a perspective view of a detail shown detached.

Referring to the drawings, the numeral 20 designates the front axle having a king pin 21 provided at each end thereof. The king pins act as the pivotal members for the wheel spindles, the right one being designated by the numeral $22^R$ and the left by the numeral $22^L$. On spindle $22^R$ there is mounted a wheel $23^R$, and on the spindle $22^L$ a wheel $23^L$. Secured to the spindle $22^R$, in any suitable manner, there is an arm 24 having one end of the tierod 25 secured to its free end. A corresponding arm 26 is secured to the spindle $22^L$ to the free end of which the other end of the tierod 25 is secured. Thus the two spindles $22^R$ and $22^L$ are connected together by means of arms 24, 26 and tierod 25. An arm 27 is secured to the spindle $22^R$ in any suitable manner, the free end of said arm 27 having the drag link 28 connected thereby. This drag link 28 may be connected by any usual means with a hand steering wheel, (not shown).

Axle 20 may have a pin 29 seated in an aperture therein and secured by means of pins 30. Pin 29 extends above the upper surface of the axle, as shown in Fig. 2. An inertia element, in the form of a flywheel 31, of suitable size and weight, is rotatably supported on pin 29. A pinion 32 may be formed integral with or secured to the flywheel 31, the teeth of said pinion being comparatively long, for purposes to be described hereinafter.

A bracket 35 having a hub portion 36, apertured to fit over the pin 29, is secured to said pin, directly above the pinion 32, by means of a key 37, thereby holding the bracket immovable with respect to the pin. This bracket comprises a U-shaped arm including branches $35^a$ and $35^b$ joined together by the end portion 38. The branch $35^a$ terminates in the hub portion 36, while branch $35^b$ terminates near the edge of the pinion. Each branch has a slot 39 so arranged that said slots are in registration.

In Fig. 2, a roller 40 is shown positioned in the space between the branches $35^a$ and $35^b$ of the bracket. Extending from each side of the roller is a spindle 41, the one end of the spindle projecting into the slot of branch $35^a$, while the other end projects into the slot of branch $35^b$.

A rack rod 46 is pivoted to some part that moves in response to the turning movements of spindles $22^L$ and $22^R$. In the illustrated embodiment it is pivoted to an arm 261 rigid with spindle $22^L$. Roller 40 is provided to engage one edge of said rack-rod, so as to hold the teeth 47 on the opposite edge thereof in mesh with the teeth of pinion 32. The roller in turn is held in engagement with the rack-rod 46 by means of a roller slide 42 and a spring 44 interposed between the end 38 of the bracket and said slide the latter being slidably supported between the branches $35^a$ and $35^b$ of the bracket. This slide 42 comprises a web portion 43 guided between the branches $35^a$ and $35^b$, and oppositely disposed arms, one of which fits in the slot of branch $35^a$, while the other fits in the slot of $35^b$. Both arms of the shoe have concaved ends, which engage with the spindle extensions of the roller. Thus it may be seen that the spring 44 will exert an elastic force to hold said roller in engagement with the rack-rod 46 and the latter in mesh with pinion 32.

As the rack-rod 46 is held in yielding engagement with the pinion 32, any accumulation of foreign matter between the teeth, such as ice, grease, dust or dirt, will cause no damage. If foreign particles gather between the teeth and in stacking up require a greater clearance, the roller 40 will be moved toward the rear of the bracket against the pressure of spring 44. The permissible movement of slide 42 is such that the teeth 47 of the rack-rod 46 may move almost all the way out of engagement with the pinion. Thus considerable foreign matter may accumulate between the gear teeth 42 and the rack teeth 47 before the device will operate sluggishly.

The provision of the spring-held roller 40 also permits shifting of the rack-rod 46 relative to the pinion, due to the circular motion of the arms 24 and 26. Thus the pitch lines of both the pinion teeth and the teeth on the rack will be held in proper relation, even though the rack-rod is moved angularly.

When operating a motor vehicle under certain conditions, such as over an uneven roadway, the guiding roadwheels may start to wobble back and forth, said wobble being commonly known as "shimmying". At times the shimmying effects will continue for a substantially long time, thus making the operation of the vehicle disagreeable and at times dangerous. As has been mentioned before, it is the object of the present invention to reduce or substantially eliminate this shimmying action. The steering train of the present invention is in operative connection with an inertia element in the form of a flywheel, which tends to resist any sudden motion tending to set it into rotation.

When the wheels 23$^R$ and 23$^L$ start to shimmy, the tierod 25 will move or try to move toward the right and left (as viewed in Fig. 1), in short, sudden, jerky movements, thus tending to reciprocate the rack-rod 46, which, by its reciprocation, tends to set the flywheel 31 into motion. More specifically, when the wheels 23$^R$ and 23$^L$ move so as to cause the spindles to rotate in a clockwise direction about the kingpins 21, the tierod 25 will move to the right. Thus the rack-rod 46 will tend to start the flywheel 31 into clockwise rotation. The flywheel will at first resist the sudden movement of the rack-rod 46 to the left, this reacting on the movement of the wheels in the clockwise direction and substantially retarding this movement. In the opposite direction of the shimmy, or when the wheels move the spindles to rotate in a counter-clockwise direction, the tierod 25 will move to the left and, the rack-rod 46 to the right. The previous movement of the shimmy will have started the flywheel to rotate in a clockwise direction, which is now being resisted by the reverse movement of the shimmy. It may clearly be seen that the inertia force of the flywheel and the reverse force of the shimmy are in direct opposite phase, so that now, even a greater inertia force is exerted against the shimmy force. From this it will be seen that each movement of the tierod caused by shimmying, is counteracted and resisted by the flywheel 31, so that the shimmy movement is substantially reduced or eliminated.

From the above it may be seen that sudden movement to rotate the flywheel will be resisted. However, if a gradual force is applied, this resistance is slight. Thus, when the steering mechanism is operated by hand from the steering wheel for the purpose of guiding the vehicle, the flywheel will exert small resistance and, consequently, no dragging effects will be noticed at the steering wheel.

While the form of embodiment of the invention as herein disclosed, constitutes a preferred form, it is to be understood that other forms might be adopted, all coming within the scope of the claims which follow.

What I claim is:

1. In a device of the character described, the combination with an axle having a wheel carrying spindle pivoted at each end thereof; of steering mechanism comprising a tierod connecting both spindles; a pin secured to the axle; a flywheel including a pinion, rotatably mounted on said pin; a rack engaging said pinion and having one end attached to a part moving with the pivoted spindles so as to be reciprocated thereby when the tierod is moved; a bracket supported on the said pin; and means carried by the bracket for yieldingly holding the rack in engagement with the pinion.

2. In a device of the character described, the combination with an axle having a wheel carrying spindle pivoted at each end thereof, of steering mechanism comprising a tierod connecting both spindles; a pin secured to the axle; a flywheel and pinion rotatably mounted on said pin; a rack engaging said pinion and having its one end pivotally attached to a member moving with the pivoted spindles so as to be reciprocated thereby when the spindles are turned; a bracket supported on the pin; a roller movably supported on the bracket and engaging with the rack; and a spring-controlled shoe interposed between the roller and bracket and adapted to hold the roller against the rack.

In testimony whereof I affix my signature.

CHARLES R. SHORT.